US012562607B2

(12) United States Patent (10) Patent No.: US 12,562,607 B2
Changarankumarath Pradeepkumar et al. (45) Date of Patent: Feb. 24, 2026

(54) LAMINATE FOR STATOR CORE WITH FLUID CONTAINMENT FEATURE

(71) Applicant: Ford Global Technologies, LLC, Dearborn, MI (US)

(72) Inventors: Akash Changarankumarath Pradeepkumar, Westland, MI (US); Singar Rathnam, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 425 days.

(21) Appl. No.: 18/156,070

(22) Filed: Jan. 18, 2023

(65) Prior Publication Data

US 2024/0243622 A1 Jul. 18, 2024

(51) Int. Cl.
*H02K 1/16* (2006.01)
*H02K 1/18* (2006.01)

(52) U.S. Cl.
CPC ................. *H02K 1/16* (2013.01); *H02K 1/18* (2013.01); *H02K 2201/09* (2013.01)

(58) Field of Classification Search
CPC ......... H02K 1/16; H02K 1/18; H02K 2201/09
See application file for complete search history.

(56) References Cited

U.S. PATENT DOCUMENTS

| | | | | |
|---|---|---|---|---|
| 6,057,624 A * | 5/2000 | Ohtake | .................. | H02K 3/487 |
| | | | | 310/216.069 |
| 6,483,221 B1 * | 11/2002 | Pawellek | .............. | H02K 1/148 |
| | | | | 310/216.066 |
| 8,203,251 B2 | 6/2012 | Ishizuka et al. | | |
| 10,063,118 B2 | 8/2018 | Yoshida et al. | | |
| 10,158,262 B2 * | 12/2018 | Kudose | .................... | H02K 1/16 |
| 10,658,884 B2 | 5/2020 | Honjo | | |
| 2012/0104902 A1 * | 5/2012 | Fukui | ..................... | H02K 24/00 |
| | | | | 310/68 B |
| 2018/0054094 A1 * | 2/2018 | Dlala | ....................... | H02K 1/14 |
| 2019/0348889 A1 * | 11/2019 | Liu | ........................... | H02K 1/20 |
| 2019/0356180 A1 * | 11/2019 | Nakamura | ............... | H02K 3/28 |
| 2020/0389064 A1 * | 12/2020 | Leong | .................... | H02K 5/203 |
| 2022/0094248 A1 | 3/2022 | Kobayashi et al. | | |
| 2022/0311290 A1 * | 9/2022 | Rathnam | ................ | H02K 1/276 |

FOREIGN PATENT DOCUMENTS

| | | | | | |
|---|---|---|---|---|---|
| CN | 211456822 U | * | 9/2020 | .............. | H02K 1/06 |
| EP | 0552378 A1 | * | 7/1993 | | |
| JP | 2011139588 | | 7/2011 | | |
| JP | 4973420 | | 7/2012 | | |
| JP | 2016059227 | | 4/2016 | | |
| JP | 6225624 | | 11/2017 | | |
| JP | 2020150611 | | 9/2020 | | |
| WO | WO-2015148258 A1 | * | 10/2015 | .............. | H02K 1/04 |
| WO | 2022128632 | | 6/2022 | | |

* cited by examiner

*Primary Examiner* — Mohamad A Musleh

(74) *Attorney, Agent, or Firm* — Burris Law, PLLC

(57) ABSTRACT

A laminate for a stator core, the laminate includes an annular body defining an inner edge, a plurality of wire slots extending radially outward from the inner edge, and a containment zone disposed radially outward of the plurality of wire slots. The containment zone is configured to contain fluid applied radially outward from the plurality of wire slots.

20 Claims, 7 Drawing Sheets

LAMINATE FOR STATOR CORE WITH FLUID CONTAINMENT FEATURE

FIELD

The present disclosure relates to electric motors, and more particularly to maintenance of electric motor components.

BACKGROUND

The statements in this section merely provide background information related to the present disclosure and may not constitute prior art.

Electric propulsion systems in vehicles use electric motors to propel the vehicle as an alternative or in addition to internal combustion engines. Generally, varnish is applied to the electric motors to protect against corrosion and contaminant, thereby improving an operation life of the electric propulsion system. The varnish can be applied with a machine designed to apply the varnish to various components of the motors. During application, varnish may flow away from an intended location or component that uses the varnish, increasing the total amount of varnish used and potentially disrupting operation of other parts of the electric motor.

The present disclosure addresses challenges related to varnish application to electric motors.

SUMMARY

This section provides a general summary of the disclosure and is not a comprehensive disclosure of its full scope or all of its features.

A stator assembly for an electric motor includes a stator core including a cylindrical body defining a bore providing an inner surface, a plurality of wire slots extending radially outward from the inner surface, and a containment zone disposed radially outward of the plurality of wire slots. The containment zone is configured to contain fluid applied to a surface of the stator core spaced from the wire slot.

In variations of the assembly, which may be implemented individually or in combination: the cylindrical body comprises a plurality of laminates, and the containment zone is defined in an outermost one of the plurality of laminates; the cylindrical body further defines a fastener slot, wherein the containment zone is disposed radially inward of the fastener slot; the stator core further comprises a visible pattern formed on an outer surface of the cylindrical body, wherein the containment zone is disposed radially inward of the visible pattern; the containment zone is a chamber defined within the cylindrical body; the chamber is defined between an outermost laminate and an adjacent laminate.

In another form, a laminate for a stator core includes an annular body defining an inner edge, a plurality of wire slots extending radially outward from the inner edge, and a containment zone disposed radially outward of the plurality of wire slots. The containment zone is configured to contain fluid applied radially outward from the plurality of wire slots.

In variations of the laminate, which may be implemented individually or in combination: further including an adhesive disposed radially outward of at least one of the plurality of wire slots; the containment zone is disposed radially outward of the adhesive; the containment zone is disposed between the adhesive and at least one of the plurality of wire slots; further including a visible pattern formed on an outer surface of the annular body, wherein the containment zone is disposed radially inward of the visible pattern; the annular body further defines a fastener slot, wherein the containment zone is disposed radially inward of the fastener slot; the annular body further defines a plurality of containment zones disposed circumferentially around the laminate; the containment zone is a hole extending through the annular body; the hole is substantially arcuate.

In another form, a stator core assembly for an electric motor includes a stator core including a plurality of laminates arranged in an axial direction, each laminate defining a plurality of wire slots extending radially from an inner edge. The plurality of laminates includes an outermost laminate defining a containment zone disposed radially outward of the plurality of wire slots of the outermost laminate and extending axially toward an adjacent laminate. The containment zone of the outermost laminate is configured to collect fluid applied on an outermost surface of the stator core away from the plurality of wire slots.

In variations of the assembly, which may be implemented individually or in part: further including an adhesive adhering adjacent ones of the plurality of laminates, wherein the containment zone is disposed radially outward of the adhesive; further including an adhesive adhering adjacent ones of the plurality of laminates, wherein the containment zone is disposed radially between the adhesive and at least one of the plurality of wire slots; the containment zone is a chamber defined by a hole extending through the outermost laminate to an adjacent laminate; the stator core further comprises a visible pattern formed on an outer surface of the cylindrical body, wherein the containment zone is disposed radially inward of the visible pattern.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
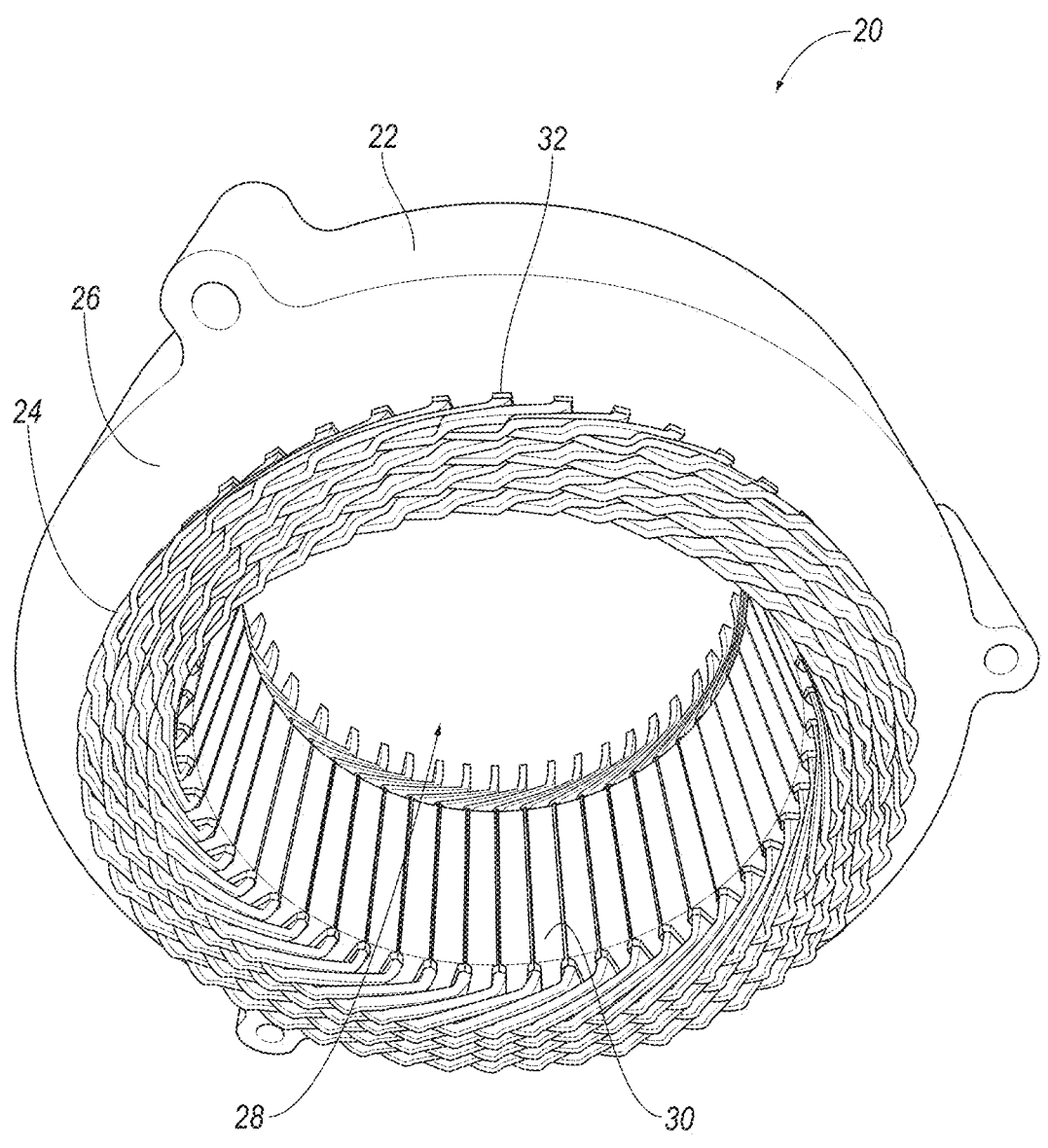
FIG. 1 is a perspective view of a stator of an electric motor according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Among other components, an electric motor includes a stator that is a stationary component generating an electromagnetic field and a rotor which rotates relative to the stator due to the electromagnetic field. The electric motor is a component of an electric propulsion for a motor vehicle such as an "electric vehicle." The electric motor propels the motor vehicle by rotating one or more wheels of the motor vehicle. In one example, the electric motor is a sole propulsion of the vehicle, such as in a fully electric vehicle. Alternatively, the electric motor can be part of a hybrid propulsion that includes an internal combustion engine, such as in a hybrid-electric vehicle.

Figure 2:
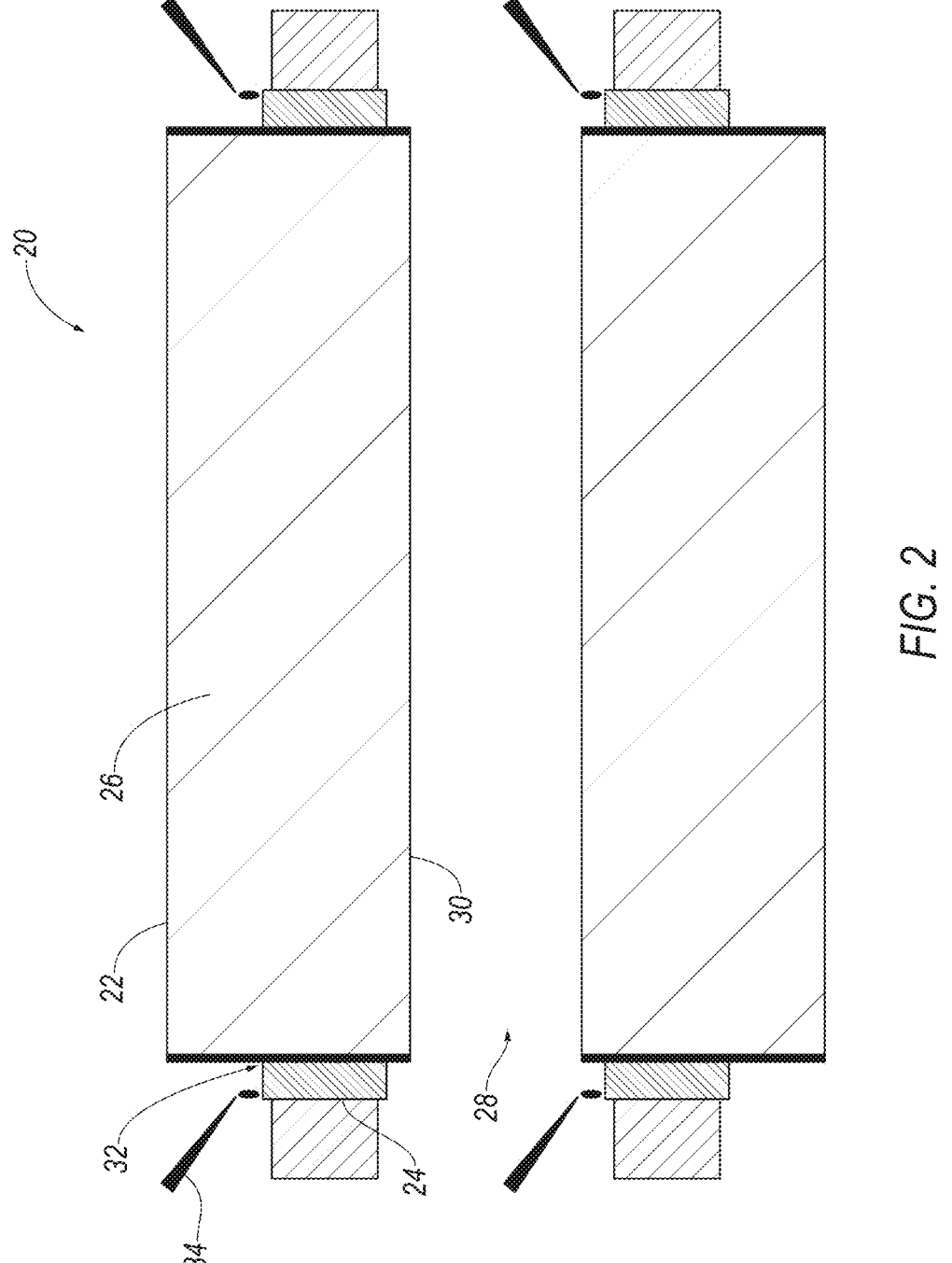
FIG. 2 is a side cross-sectional section view of the stator according to the present disclosure.

With reference to FIGS. 1-2, an example of a stator 20 for an electric motor is illustrated and includes a stator core 22 and a plurality of wires 24. The stator core 22 has a substantially cylindrical body 26 defining a bore 28 extending therethrough. The bore 28 provides an inner surface 30 of the body 26. The stator core 22 further defines a plurality of slots 32 extending radially outward from the inner surface 30.

In one form, one or more wires 24 from among the plurality of wires 24 reside in each slot 32. The wires 24 are formed of an electrically conducting material, such as copper. With the wires 24 arranged in the slots 32, electric current flow through the wire 24 generating electromagnetic field that drives the rotor.

With reference to FIG. 2, a cross-sectional view of the stator 20 is shown. To inhibit corrosion or deterioration of electrical properties of the wires 24 and to improve durability of the stator 20 by holding stator laminates and/or copper wires and/or intermediate paper layers together in a generally rigid manner, a varnish (not shown) is applied to the stator during assembly of the electric motor and hardens or cures into a generally rigid form that holds the components of the stator 20 together. The varnish is typically applied to an outermost surface of the stator core 22 with a varnish injector 34 having an injector nozzle. In an example application, varnish is applied to the slot 32 and onto the wires 24 as well as into a gap between a surface of the slot 32 and the intermediate paper layer (not shown). Specifically, the varnish flows in narrow spaces (i.e., capillaries), such as the slot 32, by adhesion, viscosity, and/or surface tension with the slot 32 without significant influence by, or even against, the force of gravity. During application, the stator core 22 is rotated to allow the varnish injector 34 to apply the varnish to each of the slots 32 and the wires 24 therein. When applying varnish to the stator core 22, excess varnish spreading away from the slot 32 (i.e., "stray" varnish) may interfere with other parts of the stator 20, potentially inhibiting operation thereof, and increases a total amount of varnish needed for the stator core 22. Controlling flow of varnish into the slots 32 reduces a total amount of varnish used and improves manufacturing of the electric motor, addressing this concern with conventional stator cores.

Figure 3:
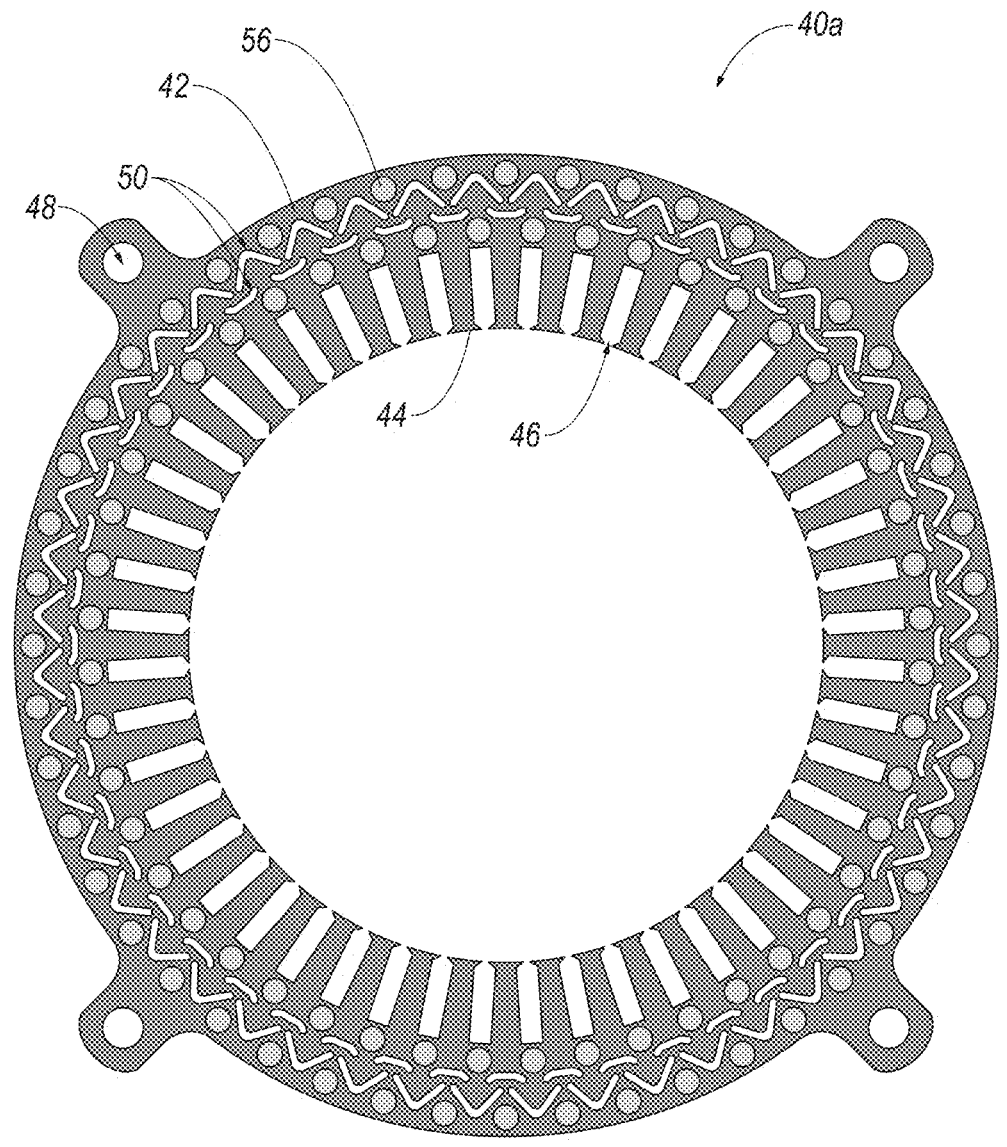
FIG. 3 is a front view of the stator according to the present disclosure.
Figure 4A:
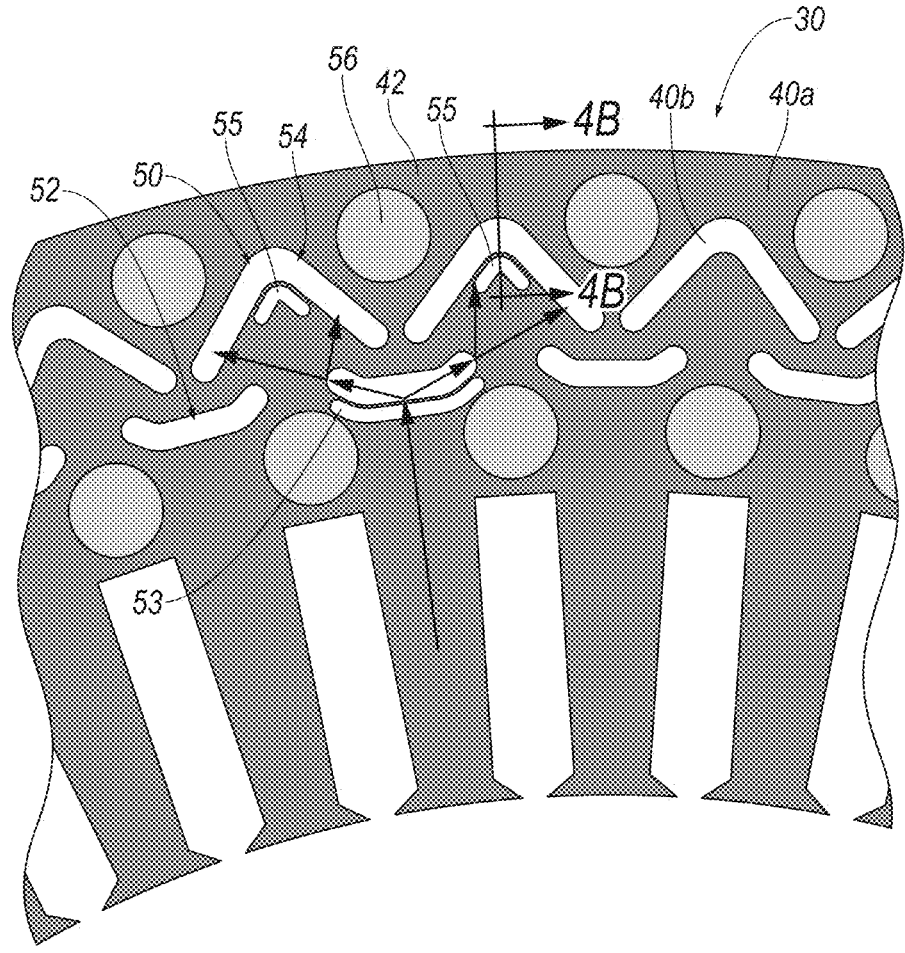
FIG. 4A is a magnified view of containment zones of FIG. 3.
Figure 4B:
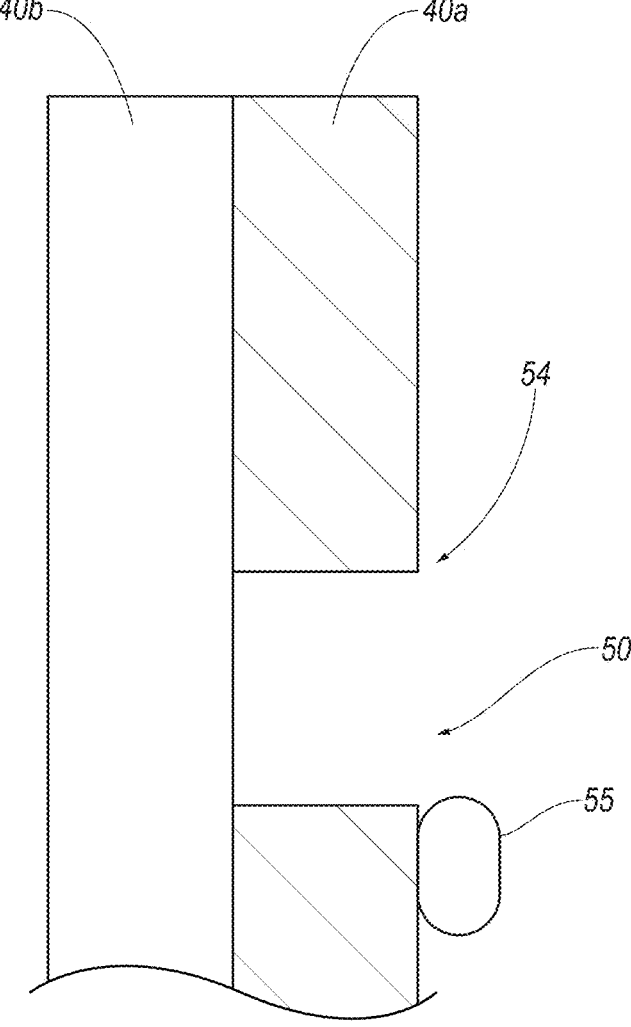
FIG. 4B is a cross-sectional view of one of the containment zones of FIG. 4A along the line 4B-4B.

In one application, the stator core 22 includes a plurality of laminates 40, including an outermost laminate 40a as shown in FIG. 3 and one or more inner laminates 40b, shown in FIGS. 4A-4B. The outermost laminate 40a has an annular body 42 defining an inner edge 44 that forms part of the inner surface 30 facing the bore 28. A plurality of wire slots 46 extend radially outward from the inner edge 44. The wire slots 46 extend axially toward respective wire slots 46 of adjacent laminates 40, forming the slots 32 of the stator core 22 when the laminates 40 are stacked together. The laminate 40 may also include one or more fastener slots 48 configured to receive a fastener (not shown), such as a bolt. The fastener extends through the fastener slots 48 of the laminates 40 to secure the laminates 40 of the stator core 22 to each other.

In one form, the laminates 40 include an adhesive 56 that adheres the annular body 42 of one of the laminates 40 with an adjacent laminate 40 of the stator core 22. The adhesive 56 is applied to the annular body 42 in a suitable manner, shown as dots of adhesive 56. The adhesive dots 56 are arranged circumferentially around the annular body 42 radially outward of the plurality of wire slots 46 to provide substantially consistent adhesion to the other laminate 40. In one form, the adhesive 56 is disposed both radially inward and outward of the containment zones 50, described below. In other forms shown below, the adhesive 56 is disposed between the containment zones 50 and the wire slots 46. In yet another form not shown, the adhesive 56 is disposed only radially outward of the containment zones 50. In yet another form, the stator core 22 lacks adhesive 56 entirely, and the laminates 40 are joined by another method such as welding.

The laminates 40 define at least one containment zone 50 disposed radially outward of the plurality of wire slots 46. In this context, a "containment zone" is a portion of the laminates 40 configured to contain fluid (such as varnish) applied to a surface of the stator core 22. In the form of FIGS. 3-4B, the containment zone 50 is a hole, slot, or other void defined in a portion of the laminate 40 spaced away from the wire slots 46. When the laminates 40 are stacked to form the cylindrical body 26, the void defines a chamber delimited between the outermost laminate 40a and the surface of an adjacent laminate 40b. Stray varnish collects in the chamber, thereby contained in the containment zone 50. In this form, the annular body 42 defines a plurality of containment zones 50 disposed circumferentially around the laminate 40a. In general, the chamber of the containment zone 50 is defined between two adjacent parts of the cylindrical body 26 of the stator core 22, such as the outermost laminate 40a and an adjacent inner laminate 40b. In another form, the chamber of the containment zone 50 is defined between more than two adjacent parts, such as the outermost laminate 40a that defines a portion of the void of the chamber, an intermediate laminate (not shown) that includes the remainder of the void, and an inner laminate 40b that defines a surface that ends the chamber. In such a form, more varnish may be collected in the chamber than a form in which only the outermost laminate 40a defines the containment zone 50.

Referring back to FIG. 4A, the containment zones 50 in this form include inner arcuate slots 52 and outer angular slots 54. As the varnish travels along the surface of the laminate 40a, the varnish may first arrive at the inner arcuate slots 52. Because the varnish is viscous, the surface tension of the varnish may form a dam 53 along the edge of the inner arcuate slot 52, holding the varnish out of the inner arcuate slot 52. Then, as more varnish accumulates, the surface tension can no longer hold the dam 53, and the varnish flows into the chamber defined by the inner arcuate slot 52. If varnish continues to accumulate, the varnish fills the chamber and overflows toward the outer angular slots 54, forming another varnish dam 55 that inhibits movement of the varnish. As varnish continues to accumulate further, the dam 55 breaks and the varnish flows into the chamber defined by the outer angular slot 54. The outer angular slots 54 are angled to direct the varnish toward a center portion of the outer angular slots 54, i.e., the portion of the containment zone 50 that forms the angle of the angular slots 54.

In another form, the voids defining the containment zones 50 have different shapes, such as outer arcuate slots, inner angular slots, substantially straight slots, sinusoidally-shaped slots, and combinations thereof. In addition, one or more voids having same or different shapes may be employed in each containment zone 50. The containment zones 50 thus collect varnish that could otherwise interfere with other parts of the stator core 22.

Figure 5:
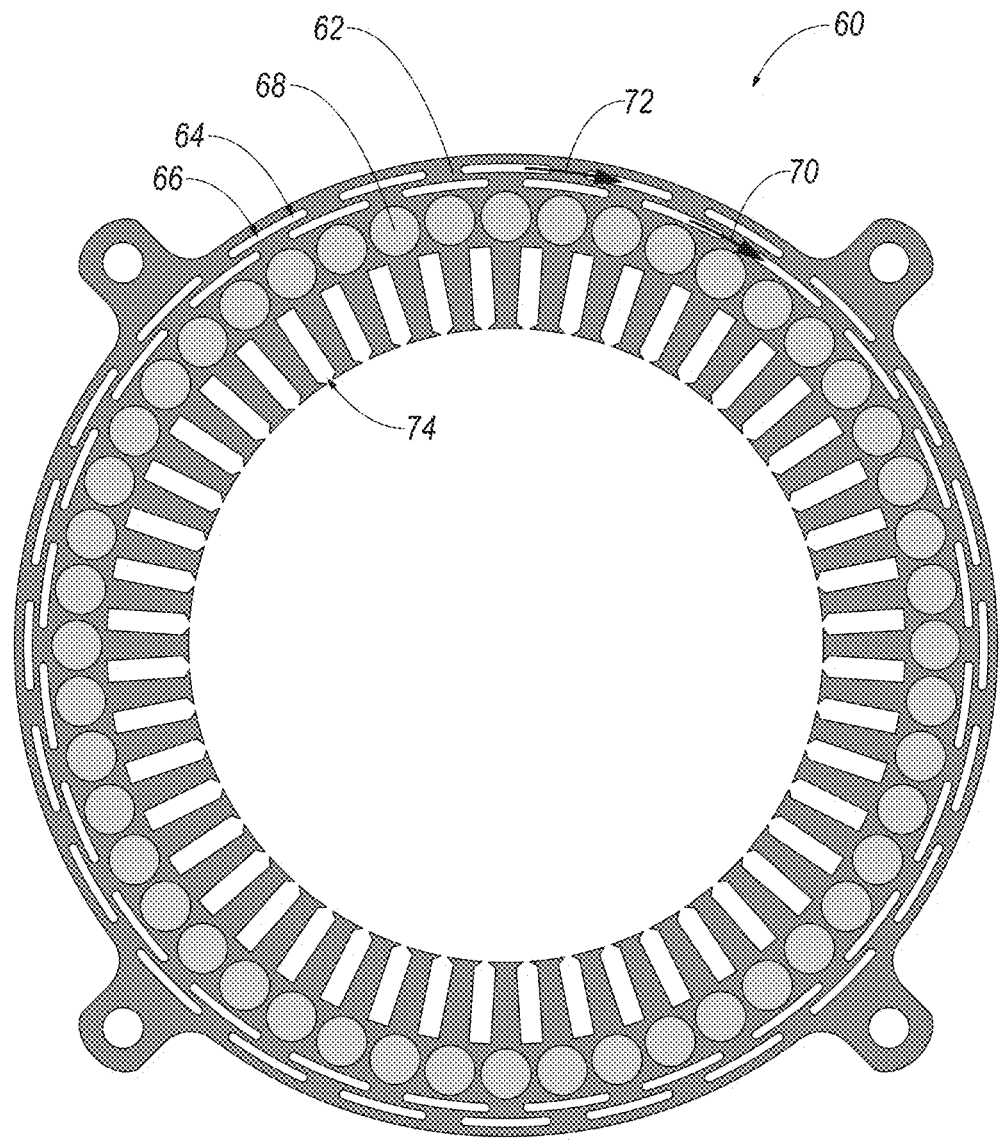
FIG. 5 is a front view of another laminate of the stator according to the present disclosure.

With reference to FIG. 5, another form of containment zones are provided on a laminate 60. In this form, the annular body 62 includes containment zones 64 that are substantially arcuate slots 66 arranged radially outward of adhesive 68, shown as adhesive dots 68. The slots 66 are staggered into two circumferential arrangements, collecting varnish along an entire circumference of the annular body 62. That is, an inner set 70 of arcuate slots 66 and an outer set 72 of arcuate slots 66 are arranged to overlap radially at specified locations, forming a complete circumference to collect varnish flowing away from any of the wire slots 74. As such, stray varnish flowing radially outward on the surface of the laminate 60 may be collected by at least one of the arcuate slots 66.

Figure 6:
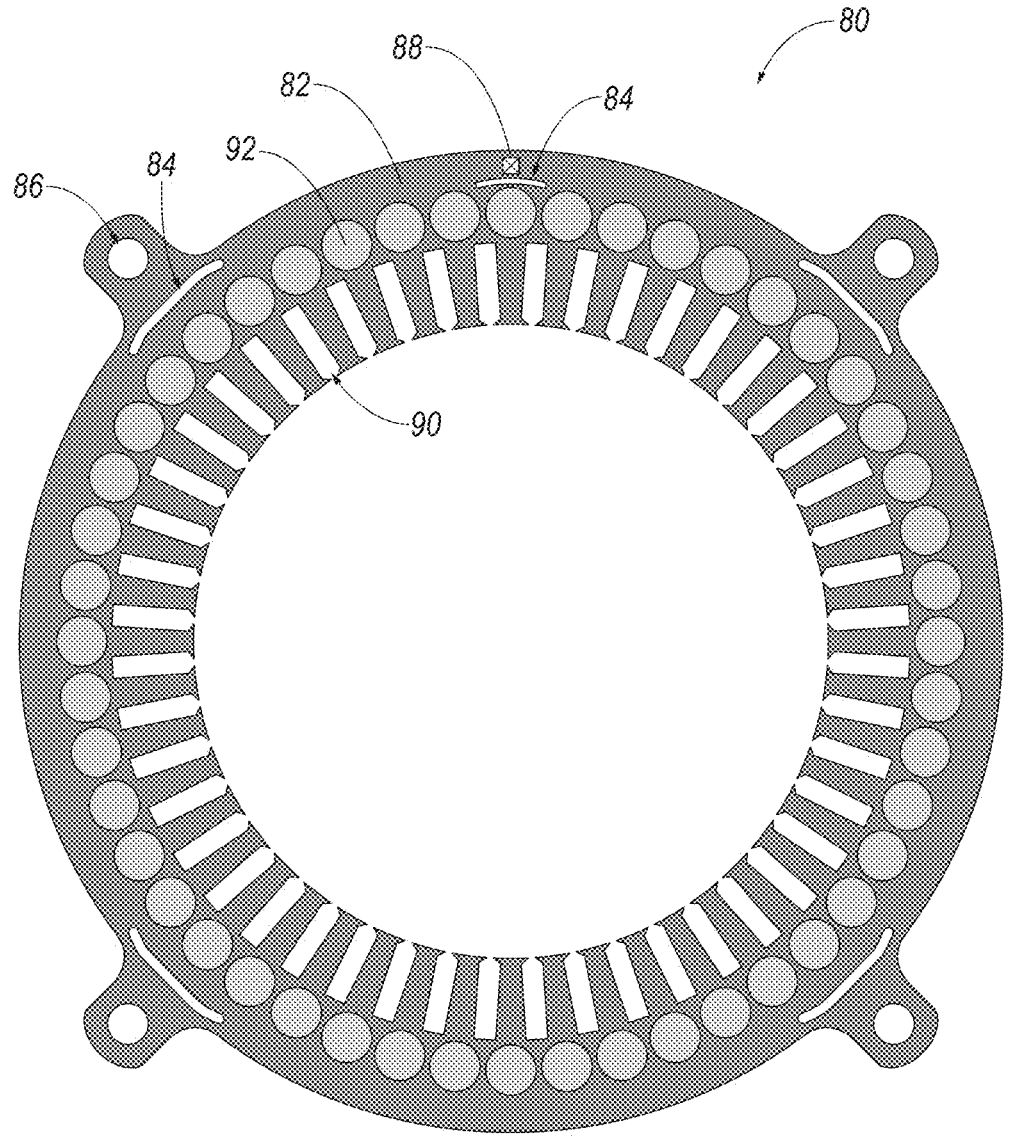
FIG. 6 a front view of another laminate of the stator according to the present disclosure.

Now referring to FIG. 6, another form of containment zones are provided on a laminate 80. In this form, the annular body 82 defines the containment zones 84 that are disposed at selected location, such as proximate to the fastener slots 86 and a visible pattern 88. In this form, the containment zones 84 are located to protect specific portions of the laminate 80 from varnish contamination. One of these specific portions, the fastener slot 86, houses a fastener that secures the laminates 80, and varnish contamination of the fastener slot 86 may inhibit the fastening strength of the fastener. The containment zones 84 are located radially inward of the fastener slots 86 to collect varnish moving radially outward from the wire slots 90.

Another specific portion of the laminate 80 may include a visible pattern 88 that provides identifying information about the electric motor. The visible pattern 88 is formed on an outer surface of the annular body 82 for detection by a vision system or laser reader. The varnish, which may be opaque or glossy, may interfere with readability of the visible pattern 88. The containment zone 84 thus is disposed radially inward of the visible pattern 88 to inhibit the varnish from interfering with the visible pattern 88. By using fewer containment zones 84 focused on specific portions of the laminate 80, less of the annular body 82 is removed, and the overall strength of the laminate 80 is increased relative to the laminates 40, 60 shown in FIGS. 3-5. The containment zones 84 in this form are located between the specified portions of the laminate 80 and the adhesive 92, just as in FIG. 5. In another form, the surface of the laminate 80 including the visible pattern 88 lacks adhesive 92 because the surface with the visible pattern 88 is an outermost surface of the stator core 22. The outermost surface is not bonded to another laminate 80 to allow the vision system or laser reader to identify the visible pattern 88.

In another form, not shown in the FIGS., the stator core may be a monolithic body, i.e., formed of a single piece of material into which the containment zones are defined. In such a form, the containment zones may be voids that are machined out of the monolithic stator core or defined during an additive manufacturing process that builds the stator core. As an example, when the stator core is additively manufactured, additively layered material may be placed to define a void between adjacent portions of the layers. As additional layers of material are placed, the layers form walls delimiting the void, these walls and the void defining the containment zone. In yet another form, the laminates 40, 60, 80 described above may be additively manufactured to define the containment zones 50, 64, 84.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A stator assembly for an electric motor, the assembly comprising:
  a stator core including a cylindrical body defining a bore providing an inner surface, a plurality of wire slots extending radially outward from the inner surface, and a containment zone disposed radially outward of the plurality of wire slots,
  wherein the containment zone is configured to collect fluid applied to a surface of the stator core spaced from the wire slot.

2. The assembly of claim 1, wherein the cylindrical body comprises a plurality of laminates, and the containment zone is defined in an outermost one of the plurality of laminates.

3. The assembly of claim 1, wherein the cylindrical body further defines a fastener slot, wherein the containment zone is disposed radially inward of the fastener slot.

4. The assembly of claim 1, wherein the stator core further comprises a visible pattern formed on an outer surface of the cylindrical body, wherein the containment zone is disposed radially inward of the visible pattern.

5. The assembly of claim 1, wherein the containment zone is a chamber defined within the cylindrical body.

6. The assembly of claim 5, wherein the chamber is defined between an outermost laminate and an adjacent laminate.

7. A laminate for a stator core, the laminate comprising:
  an annular body defining an inner edge, a plurality of wire slots extending radially outward from the inner edge, and a containment zone disposed radially outward of the plurality of wire slots,
  wherein the containment zone is configured to collect fluid applied radially outward from the plurality of wire slots.

8. The laminate of claim 7, further comprising an adhesive disposed radially outward of at least one of the plurality of wire slots.

9. The laminate of claim 8, wherein the containment zone is disposed radially outward of the adhesive.

10. The laminate of claim 8, wherein the containment zone is disposed between the adhesive and at least one of the plurality of wire slots.

11. The laminate of claim 7, further comprising a visible pattern formed on an outer surface of the annular body, wherein the containment zone is disposed radially inward of the visible pattern.

12. The laminate of claim 7, wherein the annular body further defines a fastener slot, wherein the containment zone is disposed radially inward of the fastener slot.

13. The laminate of claim 7, wherein the annular body further defines a plurality of containment zones disposed circumferentially around the laminate.

14. The laminate of claim 7, wherein the containment zone is a hole extending through the annular body.

15. The laminate of claim 14, wherein the hole is substantially arcuate.

16. A stator core assembly for an electric motor, the assembly comprising:

a stator core including a plurality of laminates arranged in an axial direction, each laminate defining a plurality of wire slots extending radially from an inner edge, wherein the plurality of laminates includes an outermost laminate defining a containment zone disposed radially outward of the plurality of wire slots of the outermost laminate and extending axially toward an adjacent laminate, and wherein the containment zone of the outermost laminate is configured to collect fluid applied on an outermost surface of the stator core away from the plurality of wire slots.

17. The assembly of claim 16, further comprising an adhesive adhering adjacent ones of the plurality of laminates, wherein the containment zone is disposed radially outward of the adhesive.

18. The assembly of claim 16, further comprising an adhesive adhering adjacent ones of the plurality of laminates, wherein the containment zone is disposed radially between the adhesive and at least one of the plurality of wire slots.

19. The assembly of claim 16, wherein the containment zone is a chamber defined by a hole extending through the outermost laminate to an adjacent laminate.

20. The assembly of claim 16, wherein the stator core further comprises a visible pattern formed on an outer surface of a cylindrical body, wherein the containment zone is disposed radially inward of the visible pattern.

* * * * *